(12) United States Patent
Gao

(10) Patent No.: US 10,454,256 B1
(45) Date of Patent: Oct. 22, 2019

(54) WALL PANEL SUITABLE FOR INCOMING AND OUTGOING WIRES OF AUDIO-VISUAL SYSTEM

(71) Applicant: Zhongshan Ruisu electronics Co. Ltd., Zhongshan (CN)

(72) Inventor: Qikui Gao, Bozhou (CN)

(73) Assignee: Zhongshan Ruisu electronics Co. Ltd., Zhongshan (CN)

( * ) Notice: Subject to any disclaimer, the term of this patent is extended or adjusted under 35 U.S.C. 154(b) by 0 days.

(21) Appl. No.: 16/040,555

(22) Filed: Jul. 20, 2018

(30) Foreign Application Priority Data

Jun. 29, 2018 (CN) .......................... 2018 1 0695356
Jun. 29, 2018 (CN) .......................... 2018 2 1017931

(51) Int. Cl.
*H02G 3/14* (2006.01)
*H02G 3/08* (2006.01)
*H02G 3/18* (2006.01)

(52) U.S. Cl.
CPC ............... *H02G 3/083* (2013.01); *H02G 3/18* (2013.01)

(58) Field of Classification Search
None
See application file for complete search history.

(56) References Cited

U.S. PATENT DOCUMENTS

| | | | | |
|---|---|---|---|---|
| 8,404,973 B1* | 3/2013 | Gretz | ...................... | H02G 3/14 174/53 |
| 8,530,757 B2* | 9/2013 | Dinh | ...................... | H02G 3/088 174/481 |
| 8,853,534 B2* | 10/2014 | Wang | ...................... | H05K 5/03 174/66 |
| 9,543,743 B2* | 1/2017 | Valenti | ...................... | H02G 3/14 |
| 2002/0092664 A1* | 7/2002 | Young | ................... | H02G 3/185 174/66 |
| 2002/0134568 A1* | 9/2002 | Dinh | ...................... | H02G 3/088 174/50 |

* cited by examiner

*Primary Examiner* — Dimary S Lopez Cruz
(74) *Attorney, Agent, or Firm* — Gokalp Bayramoglu

(57) ABSTRACT

The present invention discloses a wall panel suitable for incoming and outgoing wires of audio-visual system, which includes a panel. The middle of the panel is provided with an outlet. The back surface of the panel is fixed with an inlet box. The lower end surface of the inlet box is provided with an inlet. The upper space and lower end of the panel are provided with a mounting hole, respectively. An opening adjusting plate is slidably arranged inside the outlet. The wall panel suitable for incoming and outgoing wires of audio-visual system can change the size of the opening by arranging a movable opening adjusting plate at the outlet, and wires with different specifications can be held, so much space is available. Moreover, since bumps are provided, after the position adjustment, the opening adjusting plate is engaged with clamping grooves.

3 Claims, 4 Drawing Sheets

WALL PANEL SUITABLE FOR INCOMING AND OUTGOING WIRES OF AUDIO-VISUAL SYSTEM

CROSS REFERENCE TO RELATED APPLICATIONS

This application is based upon and claims priority to Chinese Patent Application No. 201810695356.X (CN), filed on Jun. 29, 2018, and Chinese Utility Model Application No. 201821017931.2 (CN), filed on Jun. 29, 2018, the entire content of which is incorporated herein by reference.

TECHNICAL FIELD

The present invention relates to the technical field of wall inlet and outlet boxes, and in particular to a wall panel suitable for incoming and outgoing wires of audio-visual system.

BACKGROUND

During construction, a blank wall panel is often reserved for subsequent use in the house wiring. Usually, the blank panel should be provided with an opening for use, which is very troublesome. There are also panels with reserved openings in the market, but the size of the opening in these panels is fixed. If there are less wires, the opening would be too large and thus may not provide a good aesthetic look. However, if the wires are more, the size of the opening would not be large enough to hold the wires, which may be very inconvenient. Therefore, a wall panel of incoming and outgoing wires of audio-visual system, in which the size of the opening can be adjusted, is provided.

SUMMARY

The objective of the present invention is to provide a wall panel suitable for incoming and outgoing wires of an audio-visual system, so as to solve the problems raised in the above paragraph.

In order to achieve the above-mentioned objective, the technical solution provided by the present invention is as follows. A wall panel suitable for incoming and outgoing wires of an audio-visual system includes a panel, and the middle of the panel is provided with an outlet. The back surface of the panel is fixed with an inlet box. The lower end surface of the inlet box is provided with an inlet. Respectively, both of the upper space and lower end of the panel are provided with a mounting hole. An opening adjusting plate is slidably arranged inside the outlet.

Preferably, the side wall of the outlet is provided with a sliding groove, and the left end and the right end of the opening adjusting plate are slidably arranged inside the sliding groove. The upper inner wall and the lower inner wall of the sliding groove are both provided with bumps, and the two ends of the opening adjusting plate are provided with clamping grooves matching with the bumps.

Preferably, the outer end face of the opening adjusting plate is provided with a pushing block.

The present invention has the following technical effects and advantages. The wall panel suitable for incoming and outgoing wires of audio-visual system can change the size of the opening by arranging a movable opening adjusting plate at the outlet, and can enable wires with different specifications to get through the opening, so as to make much space available. Moreover, since bumps are provided, after the position adjustment, the opening adjusting plate is engaged with the clamping grooves, so the opening adjusting plate can be fixed, thus it is very practical.

Figure 1:
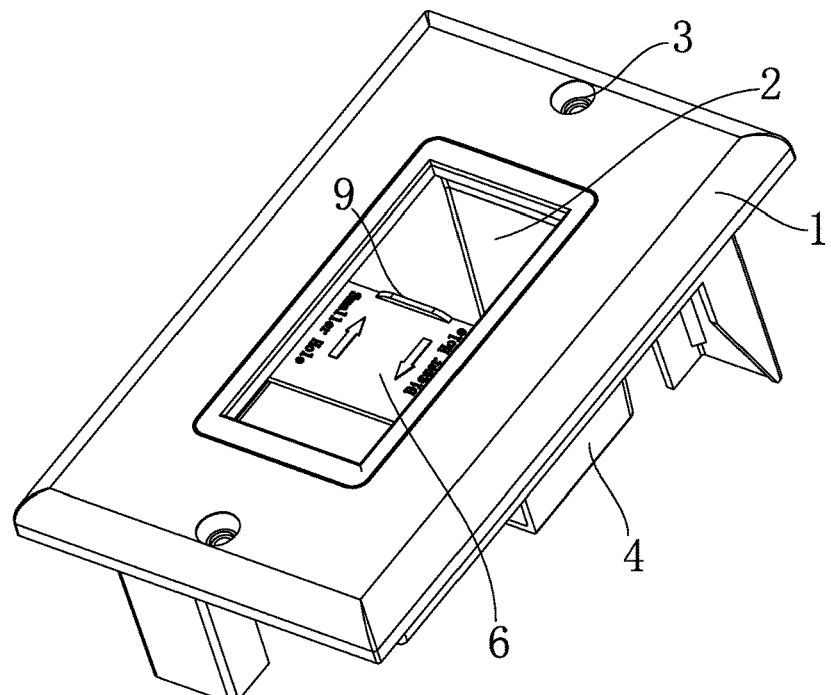
FIG. 1 is a structural schematic diagram of the present invention.
Figure 2:
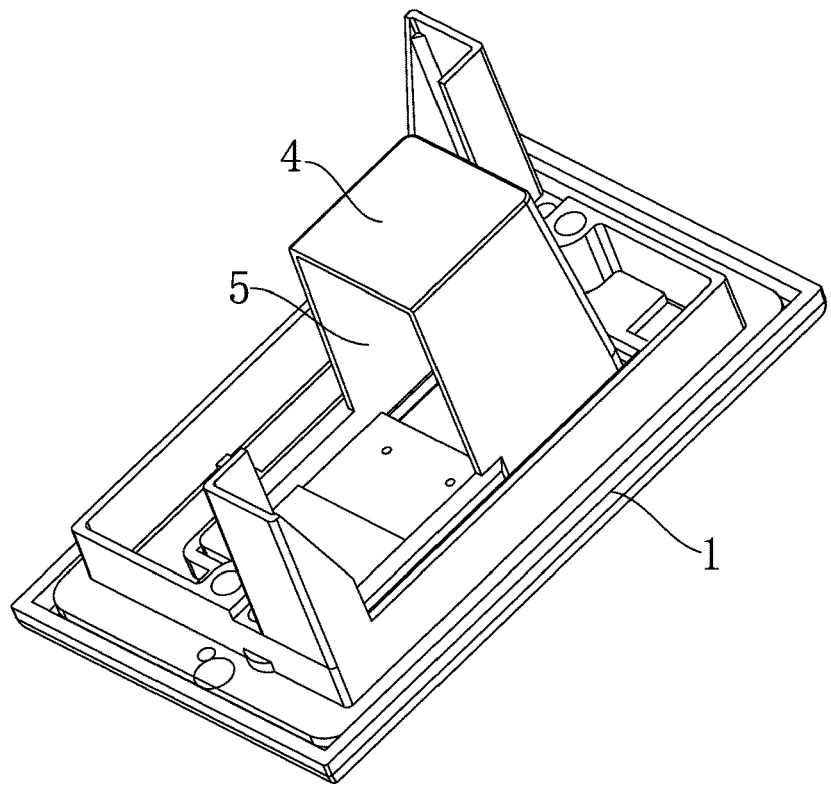
FIG. 2 is a schematic diagram showing the back structure of the present invention.
Figure 3:
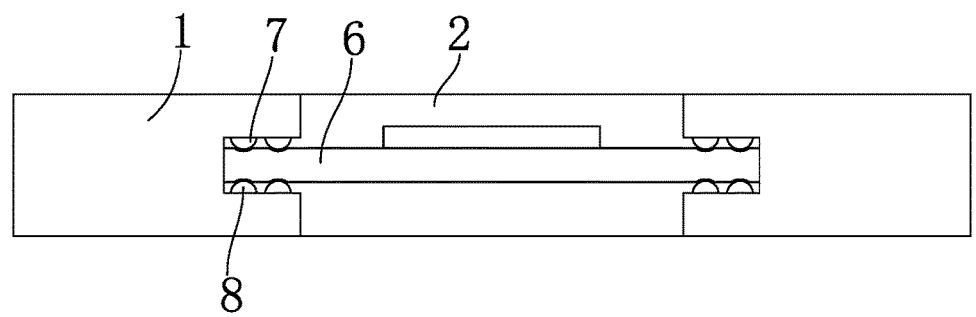
FIG. 3 is a schematic view showing the cross-sectional structure of the panel of the present invention.

In the drawings: 1-panel, 2-outlet, 3-mounting hole, 4-inlet box, 5-inlet, 6-opening adjusting plate, 7-sliding groove, 8-bump, 9-pushing block.

DETAILED DESCRIPTION

Hereinafter, the technical solution of the embodiment of the present invention will be described clearly and completely with reference to the drawings of the embodiments of the present invention. Apparently, the described embodiments are merely some of the embodiments of the present invention rather than all. Any other embodiment derived from the embodiments of the present invention by those skilled in the art without creative effort shall be considered as falling within the scope of the present invention.

The present invention provides a wall panel suitable for incoming and outgoing wires of audio-visual system as shown in FIGS. 1-6, which includes panel 1. Panel 1 can be replaced with a standard panel. The middle of panel 1 is provided with outlet 2. The back of panel 1 is fixed with inlet box 4. The lower end surface of inlet box 4 is provided with inlet 5. The upper space and the lower end of panel 1 are provided with mounting hole 3 respectively. Screws pass through mounting holes 3 to fix panel 1 to the wall. Opening adjusting plate 6 is slidably arranged in outlet 2.

Specifically, the side wall of outlet 2 is provided with sliding groove 7, and the left end and the right end of opening adjusting plate 6 are slidably arranged in sliding groove 7. Both, the upper inner wall and the lower inner wall of sliding groove 7, are provided with bumps 8. The two ends of opening adjusting plate 6 are provided with clamping grooves matched with bumps 8. Two rows of bumps 8 are arranged on both sides of opening adjusting plate 6, and the number of bumps 8 in each row are not less than two.

Specifically, the outer end surface of opening adjusting plate 6 is provided with pushing block 9.

Figure 4:
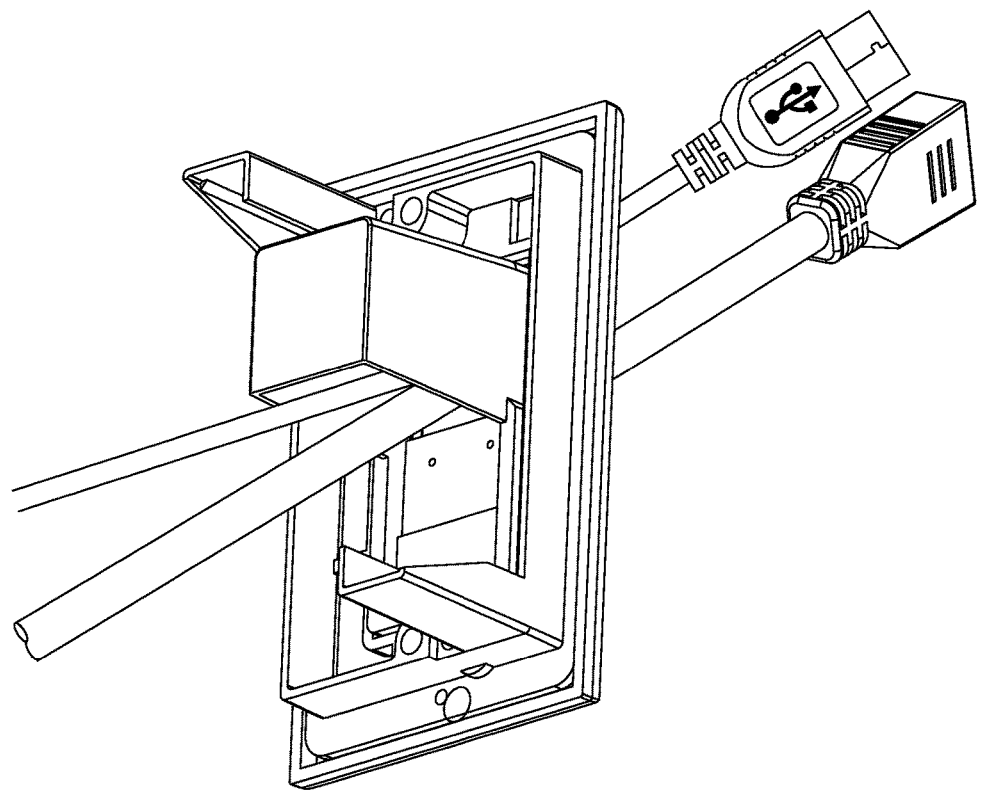
FIG. 4 is a structural schematic diagram showing the mounting of the incoming and outgoing wires of the present invention.
Figure 5:
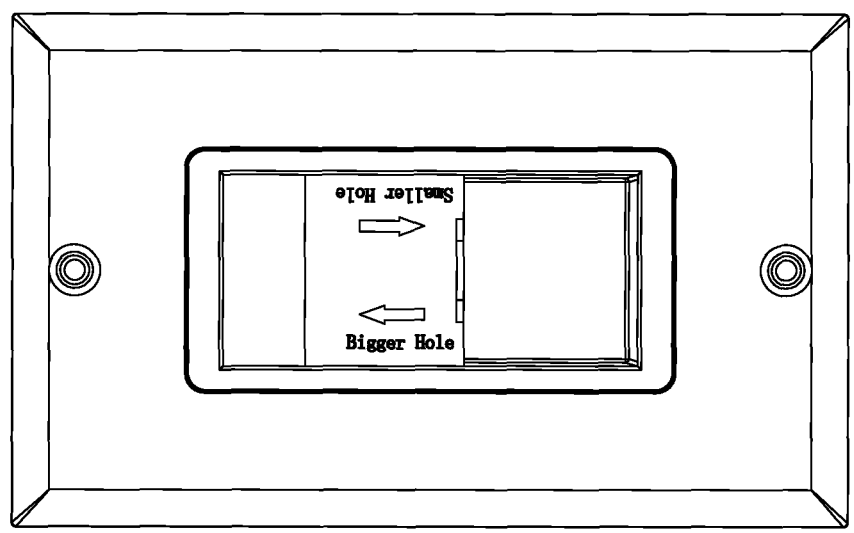
FIG. 5 is a state diagram showing that the outlet is adjusted with a small size.
Figure 6:
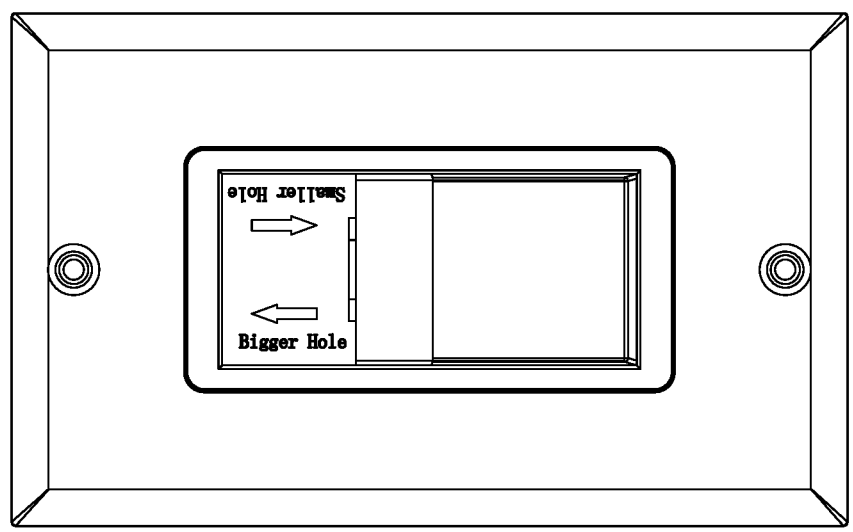
FIG. 6 is a state diagram showing that the outlet is adjusted with a big size.

This device is a wall panel suitable for incoming and outgoing wires of an audio-visual system. After the panel is fixed on the wall by user, the required wires are inserted into inlet 5 and drawn out from outlet 2 as shown in FIG. 4. The function of the panel is to move opening adjusting plate 6 of outlet 2 according to the direction of the arrow in combination with outlet 2 to change the sizes of the inlet and outlet as per need. By doing so, wires of different specifications can be passed through the opening, thus much space is available.

It should be noted that the above description is merely a preferred embodiment of the present invention and is not intended to limit the present invention.

Although the present invention has been described in detail with reference to the above-mentioned embodiment, those skilled in the art can still modify or replace the technical solution features described in the above-mentioned embodiment equivalently. However, any modification, equivalent substitution, and improvement derived without departing from the spirit and principle of the present invention shall be considered as falling within the scope of the present invention.

The invention claimed is:

1. A wall panel suitable for incoming and outgoing wires of audio-visual system, comprising:
    a panel, wherein
    a middle of the panel is provided with an outlet,
    a back of the panel is fixed with an inlet box,
    a lower end face of the inlet box is provided with an inlet,
    an upper space and a lower end of the panel are respectively provided with a mounting hole,
    an opening adjusting plate is slidably arranged inside the outlet,
    a required wire is inserted into the inlet and drawn out from the outlet after the wall panel is fixed on a wall by a user, and
    the wall panel is configured to move the opening adjusting plate of the outlet according to a direction of an arrow in combination with the outlet to change sizes of the inlet and outlet as per need.

2. The wall panel suitable for incoming and outgoing wires of audio-visual system according to claim 1, wherein
    a side wall of the outlet is provided with a sliding groove,
    a left end and a right end of the opening adjusting plate are slidably arranged in the sliding groove,
    both an upper inner wall and a lower inner wall of the sliding groove are provided with bumps, and
    the left end and the right end of the opening adjusting plate are provided with clamping grooves matching with the bumps.

3. The wall panel suitable for incoming and outgoing wires of audio-visual system according to claim 1, wherein
    a pushing block is arranged on an outer end surface of the opening adjusting plate.

\* \* \* \* \*